(12) United States Patent
Collins et al.

(10) Patent No.: US 10,253,883 B2
(45) Date of Patent: Apr. 9, 2019

(54) REDUNDANT SHAFT SEALS IN ESP SEAL SECTION

(71) Applicant: GE Oil & Gas ESP, Inc., Oklahoma City, OK (US)

(72) Inventors: Charles Collins, Oklahoma City, OK (US); James Le, Oklahoma City, OK (US)

(73) Assignee: GE OIL & GAS ESP, INC., Oklahoma City, OK (US)

( * ) Notice: Subject to any disclaimer, the term of this patent is extended or adjusted under 35 U.S.C. 154(b) by 0 days.

(21) Appl. No.: 15/306,280

(22) PCT Filed: May 1, 2014

(86) PCT No.: PCT/US2014/036415
§ 371 (c)(1),
(2) Date: Oct. 24, 2016

(87) PCT Pub. No.: WO2015/167571
PCT Pub. Date: Nov. 5, 2015

(65) Prior Publication Data
US 2017/0051829 A1    Feb. 23, 2017

(51) Int. Cl.
| | |
|---|---|
| *F16J 15/00* | (2006.01) |
| *E21B 43/12* | (2006.01) |
| *E21B 4/00* | (2006.01) |

(52) U.S. Cl.
CPC .......... *F16J 15/008* (2013.01); *E21B 4/003* (2013.01); *E21B 43/128* (2013.01)

(58) Field of Classification Search
CPC ....... F16J 15/008; E21B 4/003; E21B 43/128; E21B 2033/005; E21B 10/25
See application file for complete search history.

(56) References Cited

U.S. PATENT DOCUMENTS 2,719,737 A * 10/1955 Fletcher ............... B63H 23/321
                                                    277/389
4,243,230 A *  1/1981 Baker .................... F16J 15/406
                                                    277/387
(Continued)

FOREIGN PATENT DOCUMENTS

RU    2 390 660 C2    5/2010
RU    2 488 730 C2    7/2013
(Continued)

OTHER PUBLICATIONS

Office Action and Search issued in connection with corresponding RU Application No. 2016140818 dated Sep. 13, 2017.
(Continued)

*Primary Examiner* — Eugene G Byrd
(74) *Attorney, Agent, or Firm* — GE Global Patent Operation

(57) ABSTRACT

A seal section for use in a downhole submersible pumping system includes one or more fluid separation mechanisms, a shaft and one or more primary mechanical seals. Each of the one or more primary mechanical seals is disposed along the shaft. The seal section also includes one or more redundant shaft seals that each substantially surrounds a corresponding one of the one or more primary mechanical seals. In another aspect, a seal section for use in a pumping system includes one or more fluid separation mechanisms, a shaft, a primary mechanical seal and a redundant shaft seal. The redundant shaft seal substantially surrounds the primary mechanical seal. The seal section further includes an internal seal chamber defined by the annular space between the primary mechanical seal and the redundant shaft seal.

7 Claims, 7 Drawing Sheets

(56) References Cited

U.S. PATENT DOCUMENTS

| | | | |
|---|---|---|---|
| 4,421,999 A | 12/1983 | Beavers et al. | |
| 4,480,841 A * | 11/1984 | Schukei | F16J 15/008 |
| | | | 277/511 |
| 4,667,737 A | 5/1987 | Shaw et al. | |
| 4,684,331 A * | 8/1987 | LaGrange | F04D 29/106 |
| | | | 166/105.5 |
| 5,040,804 A * | 8/1991 | Back | F16J 15/008 |
| | | | 277/558 |
| 5,069,461 A * | 12/1991 | Orlowski | F16J 15/008 |
| | | | 277/303 |
| 5,303,933 A * | 4/1994 | Larkins | F16J 15/008 |
| | | | 277/377 |
| 5,367,214 A | 11/1994 | Turner, Jr. | |
| 6,602,059 B1 | 8/2003 | Howell et al. | |
| 7,182,584 B2 | 2/2007 | Du et al. | |
| 8,925,928 B2 * | 1/2015 | Howell | F04D 29/126 |
| | | | 277/377 |
| 2007/0207046 A1 * | 9/2007 | Du | E21B 43/128 |
| | | | 417/423.3 |
| 2007/0251705 A1 * | 11/2007 | Wells | E21B 3/02 |
| | | | 166/387 |
| 2007/0277969 A1 | 12/2007 | Hall et al. | |
| 2009/0202371 A1 | 8/2009 | Green | |
| 2012/0263610 A1 * | 10/2012 | Tetzlaff | F04D 29/0476 |
| | | | 417/410.1 |
| 2015/0211639 A1 * | 7/2015 | Grimanis | F16J 15/447 |
| | | | 277/303 |

FOREIGN PATENT DOCUMENTS

| | | |
|---|---|---|
| WO | 2007075781 A2 | 7/2007 |
| WO | 2016/089426 A1 | 6/2016 |

OTHER PUBLICATIONS

Grundfos, "Mechanical shaft seals for pumps", retrieved from http://net.grundfos.com/doc/webnet/waterutility/_assets/downloads/shaft_seals.pdf, 2009.

International Search report and Written Opinion issued in connection with corresponding Application No. PCT/US2014/036415 dated Jan. 28, 2015.

\* cited by examiner

REDUNDANT SHAFT SEALS IN ESP SEAL SECTION

TECHNICAL FIELD

This present disclosure relates generally to the field of submersible pumping systems, and more particularly, but not by way of limitation, to an improved seal section.

BACKGROUND

Submersible pumping systems are often deployed into wells to recover petroleum fluids from subterranean reservoirs. Typically, the submersible pumping system includes a number of components, including one or more fluid filled electric motors coupled to one or more high performance pumps. Each of the components and sub-components in a submersible pumping system is engineered to withstand the inhospitable downhole environment, which includes wide ranges of temperature, pressure and corrosive well fluids.

Components commonly referred to as "seal sections" protect the electric motors and are typically positioned between the motor and the pump. In this position, the seal section provides several functions, including transmitting torque between the motor and pump, restricting the flow of wellbore fluids into the motor, protecting the motor from axial thrust imparted by the pump, and accommodating the expansion and contraction of motor lubricant as the motor moves through thermal cycles during operation. Many seal sections employ seal bags, labyrinth chambers and other separation mechanism to accommodate the volumetric changes and movement of fluid in the seal section while providing a positive barrier between clean lubricant and contaminated wellbore fluid.

Because most seal sections include one or more rotating shafts that transfer torque from the motor to the pump, the fluid separation mechanisms in the seal section must be configured to accommodate the shaft. In the past, mechanical seals have been placed around the shaft to prevent fluids from migrating along the shaft. Generally, a mechanical seal includes components that provide a structural barrier against fluid migration. A popular design of mechanical seals employs a spring on the exterior of the mechanical seal that exerts axial force on components of the mechanical seal. The spring keeps the components of the mechanical seal in proper position to keep the well bore fluids from migrating along the shaft.

While generally acceptable, prior art mechanical seals may be susceptible to failure in certain environments. As wellbore fluids are drawn into the seal section, sand and other particulate solids may collect in the proximity of the mechanical seal. Contamination with solid particles degrades the performance characteristics of the mechanical seal spring and compromises the sealing surfaces of the mechanical seal, resulting in a failure of the mechanical seal. Accordingly, there exists a need for an improved design that is more resistant to contamination and wear caused by solid particles. It is to this and other deficiencies in the prior art that the embodiments are directed.

BRIEF DESCRIPTION

In an embodiment, a seal section for use in a downhole submersible pumping system includes one or more fluid separation mechanisms, a shaft and one or more primary mechanical seals. Each of the one or more primary mechanical seals is disposed along the shaft. The seal section also includes one or more redundant shaft seals that each substantially surrounds a corresponding one of the one or more primary mechanical seals.

In another aspect, a seal section for use in a pumping system, the seal section includes one or more fluid separation mechanisms, a shaft, a primary mechanical seal and a redundant shaft seal. The redundant shaft seal substantially surrounds the primary mechanical seal. The seal section further includes an internal seal chamber defined by the annular space between the primary mechanical seal and the redundant shaft seal.

DETAILED DESCRIPTION

Figure 1:
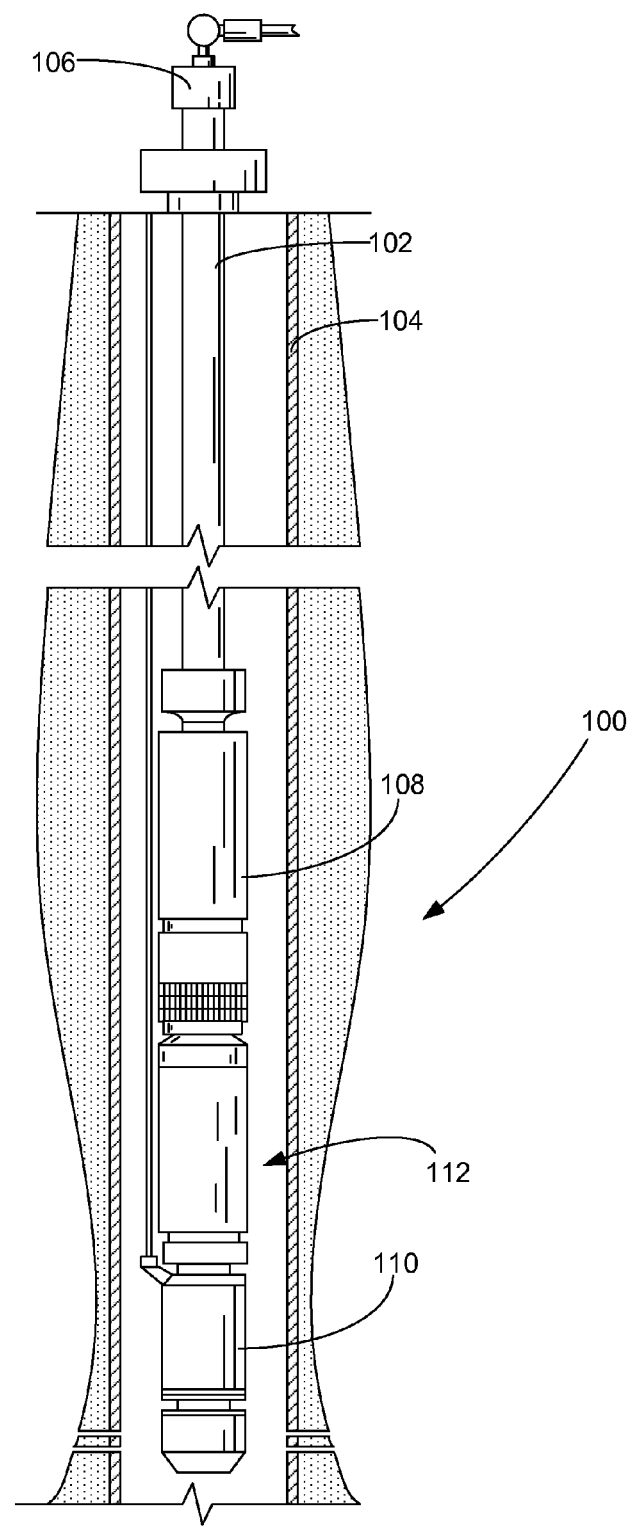
FIG. 1 is an elevational view of a submersible pumping system constructed in accordance with an embodiment.

In accordance with an embodiment, FIG. 1 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present embodiments can also be used to move other fluids. It will also be understood that, although each of the components of the pumping system are primarily disclosed in a submersible application, some or all of these components can also be used in surface pumping operations.

In an embodiment, the pumping system 100 includes some combination of a pump assembly 108, a motor assembly 110 and a seal section 112. In an embodiment, the motor assembly 110 is an electrical motor that receives power from a surface-mounted motor control unit (not shown). When energized, the motor assembly 110 drives a shaft that causes the pump assembly 108 to operate. The seal section 112 shields the motor assembly 110 from mechanical thrust produced by the pump assembly 108 and provides for the expansion of motor lubricants during operation. The seal section 112 also isolates the motor assembly 110 from the wellbore fluids passing through the pump assembly 108. Although only one of each component is shown, it will be understood that more can be connected when appropriate. It may be beneficial to use tandem-motor combinations, multiple seal sections, multiple pump assemblies or other downhole components not shown in FIG. 1. For example, in certain applications it may be beneficial to place a seal section or pressure compensating chamber 112 below the motor assembly 110.

Figure 2:
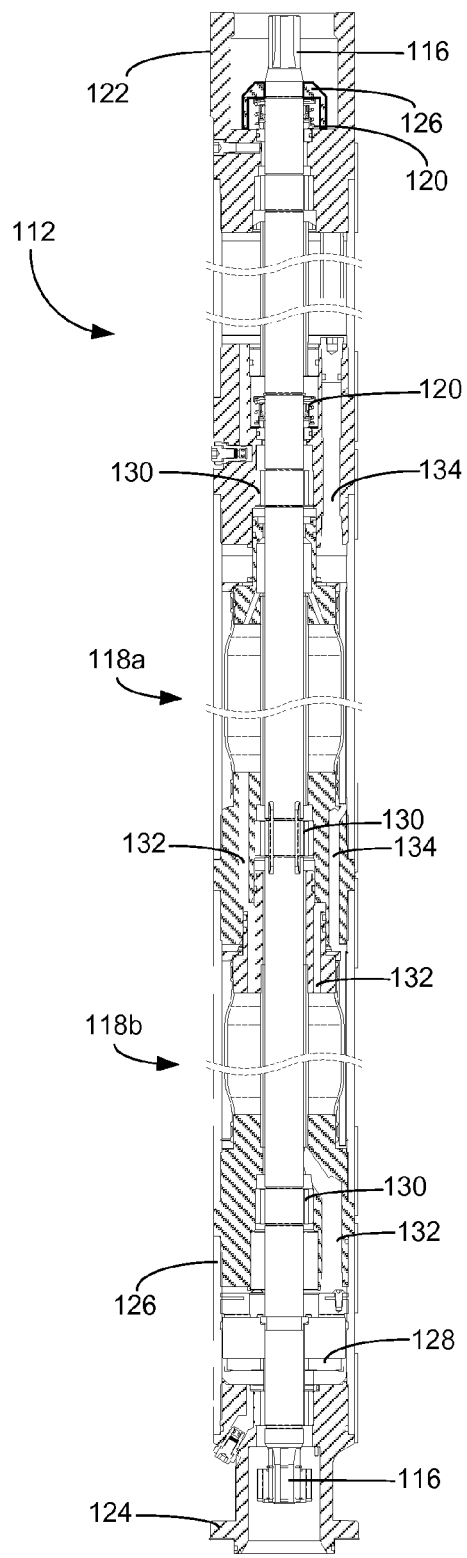
FIG. 2 is a cross-sectional view of a first embodiment of a seal section for use with the submersible pumping system of FIG. 1.

Referring now to FIG. 2, shown therein is a cross-sectional view of the seal section 112. The seal section 112 includes a housing 114, a shaft 116, and one or more fluid separation mechanisms. In the embodiment depicted in FIG. 2, the fluid separation mechanisms include a first seal bag assembly 118a and a second seal bag assembly 118b (collectively "seal bag assemblies 118"). The shaft 116 transfers mechanical energy from the motor assembly 110 to the pump assembly 108. The housing 114 is configured to protect the internal components of the seal section 112 from the exterior wellbore environment. Other separation mechanisms may be used in addition to, or as an alternative to, the seal bag assemblies 118. Such other separation mechanisms include pistons, labyrinths and bellows.

The seal section 112 further includes a plurality of primary mechanical seals 120, a head 122 configured for connection to the pump assembly 108 (not shown in FIG. 2), and a base 124 configured for connection to the motor assembly 110 (not shown in FIG. 2). In an embodiment, the head 122 and base 124 are configured for a locking threaded engagement with the housing 114. The primary mechanical seals 120 are positioned along the shaft 116 and limit the migration of fluid along the shaft 116. The seal section further includes one or more redundant shaft seals 126. In the particular embodiment depicted in FIG. 2, the seal section 112 includes a single redundant shaft seal 126 in the head 122. It will be appreciated, however, that the use of additional redundant shaft seals 126 throughout the seal section 112 is within the scope of the embodiments.

The seal section 112 further includes thrust bearings 128 and a plurality of support bearings 130. Thrust bearings 128 are used to control the axial displacement of the shaft 116. Support bearings 130 control the lateral position of the shaft 116. In the present embodiments, the thrust bearings 128 and support bearings 130 are configured as hydrodynamic bearings and constructed using industry-recognized bearing materials.

The fluid separation mechanisms of the seal section 112 further includes a series of ports, channels, chambers and tubes that permit the movement of fluids through the seal section 112. A clean fluid circulation system 132 accommodates the expansion and movement of clean motor lubricant through the seal section 112. A contaminated fluid circulation system 134 accommodates the movement of potentially contaminated wellbore fluids through the seal section 112. The contaminated fluid circulation system 134 passes fluid along the exterior of the bag assemblies 118, while the clean fluid circulation system 132 passes fluid through the interior of the bag assemblies 118.

Figure 3:
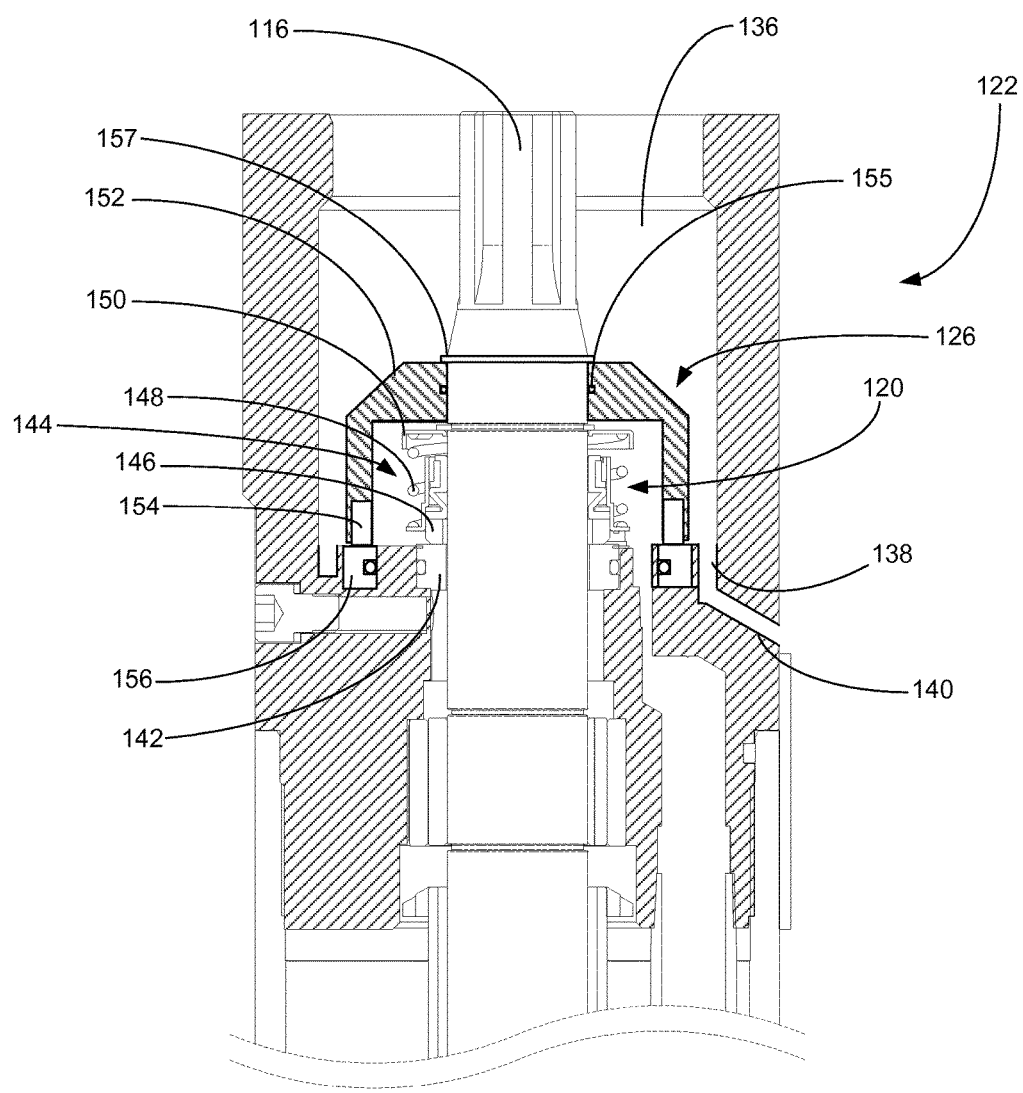
FIG. 3 is a close-up cross-sectional view of the head of the seal section of FIG. 2 showing a first embodiment of the redundant shaft seal system.

Turning to FIG. 3, shown therein is a close-up cross-sectional view of the head 122 of the seal section 112. The head 122 includes a mechanical seal chamber 136 that is configured to house the primary mechanical seal 120 and the redundant shaft seal 126. The mechanical seal chamber 136 is generally configured as a void in the head 122. The mechanical seal chamber 136 may optionally include a trench 138 for the collection of solids particles and solid ejection ports 140 configured to expel solid particles from the mechanical seal chamber. The trench 138 entraps solid particles in the mechanical seal chamber 136 at a distance spaced apart from the primary mechanical seal 120 and redundant shaft seal 126.

In an embodiment, the primary mechanical seal 120 includes a stationary ring 142 and a rotating portion 144. The stationary ring 142 is fixed in position inside the head 122 and does not rotate with the shaft 116. The rotating portion 144 is fixed to the shaft 116 and rotates with respect to the stationary ring 142. In an embodiment, the rotating portion 144 includes a runner 146, a spring 148 and a retainer ring 150. The running faces of the runner 146 and stationary ring 142 are held in contact by the spring 148, which exerts a compressive force between the retainer ring 150 and runner 146.

In the first embodiment depicted in FIG. 3, the redundant shaft seal 126 includes a cap 152, a contact ring 154 and a fixed ring 156. The fixed ring 156 is secured in a stationary position within the mechanical seal chamber 136. The cap 152 is configured as an inverted bowl that is secured at a first end to the shaft 116 and extends downward over the primary mechanical seal 120. In a particular embodiment, the cap 152 is connected to the shaft 116 with a key-and-slot mechanism. The cap 152 may include an elastomeric o-ring 155 and an axial retaining ring 157. The o-ring 152 dampens vibrations in the cap 152 and the axial retaining ring 157 fixes the cap 152 at a determined position along the shaft 116.

The contact ring 154 is connected at the second, distal end of the cap 152 in close proximity to the fixed ring 156. In a particular embodiment, the redundant shaft seal 126 is configured and installed such that the contact ring 154 is in vertical contact with the fixed ring 156. In this way, the redundant shaft seal 126 surrounds the primary mechanical seal 120 in an isolated internal seal chamber 158. In an embodiment, during assembly, the internal seal chamber 158 is filled with a relatively heavy lubricating oil or grease. The redundant shaft seal 126 discourages the migration of fluids and particles from the mechanical seal chamber 136 to the primary mechanical seal 120. The isolation of the primary mechanical seal 120 by the redundant shaft seal 126 significantly improves the useful operational life of the primary mechanical seal 120 and the balance of the components within the seal section 112.

Figure 4:
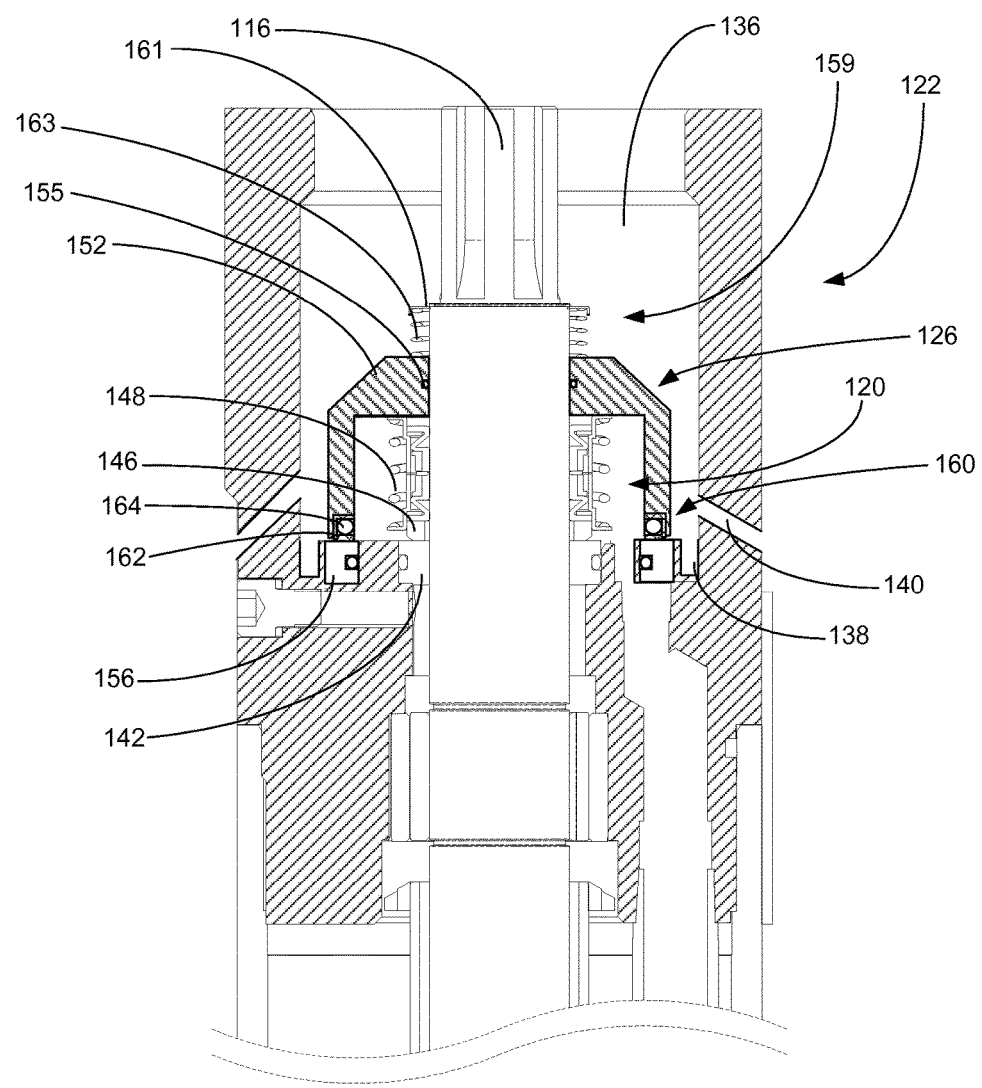
FIG. 4 is a close-up cross-sectional view of the head of the seal section of FIG. 2 showing a second embodiment of the redundant shaft seal system.

Turning to FIG. 4, shown therein is a close-up cross-sectional view of the head 122 of the seal section 112 constructed in accordance with a second embodiment. In the second embodiment depicted in FIG. 4, the redundant shaft seal 126 includes a lip seal 160 in place of the contact ring 154. The cap 152 is configured for rotation with the shaft 116. In a particular embodiment, the cap 152 is connected to the shaft 116 with a key-and-slot mechanism that allows the cap 152 to move along a longitudinal direction on the shaft 116. In an embodiment, the lip seal 160 includes a body 162 and an internal spring 164. In an embodiment, the body 162 is manufactured from a durable rubber or plastic that provides a compliant seal against the fixed ring 156. In an embodiment, the spring 164 is a coiled or spiraled metal wire or strip. The resiliency of spring 164 allows the lip seal 160 to repeatedly expand and contract without permanent deformation. During use, the lip seal 160 maintains a sealed connection against the fixed ring 156.

In the second embodiment depicted in FIG. 4, the primary mechanical seal 120 includes a lower runner 146 and a spring 148. The spring 148 presses the lower runner 146 into the stationary ring 142. It will be appreciated that the primary mechanical seal 120 depicted in FIG. 4 is substantially interchangeable with the mechanical seal 120 depicted in FIG. 3.

Continuing with FIG. 4, the seal section 112 further includes an upper spring assembly 159 that includes a spring cap 161 and spring 163. The spring cap 161 is attached to the shaft 116 above the cap 152 and provides a base for the spring 163. The spring 163 presses downward onto the cap 152. In the event the shaft 116 axially displaces, the cap 152 is kept in contact with the stationary ring 142 by the upper spring assembly 159.

Figure 5:
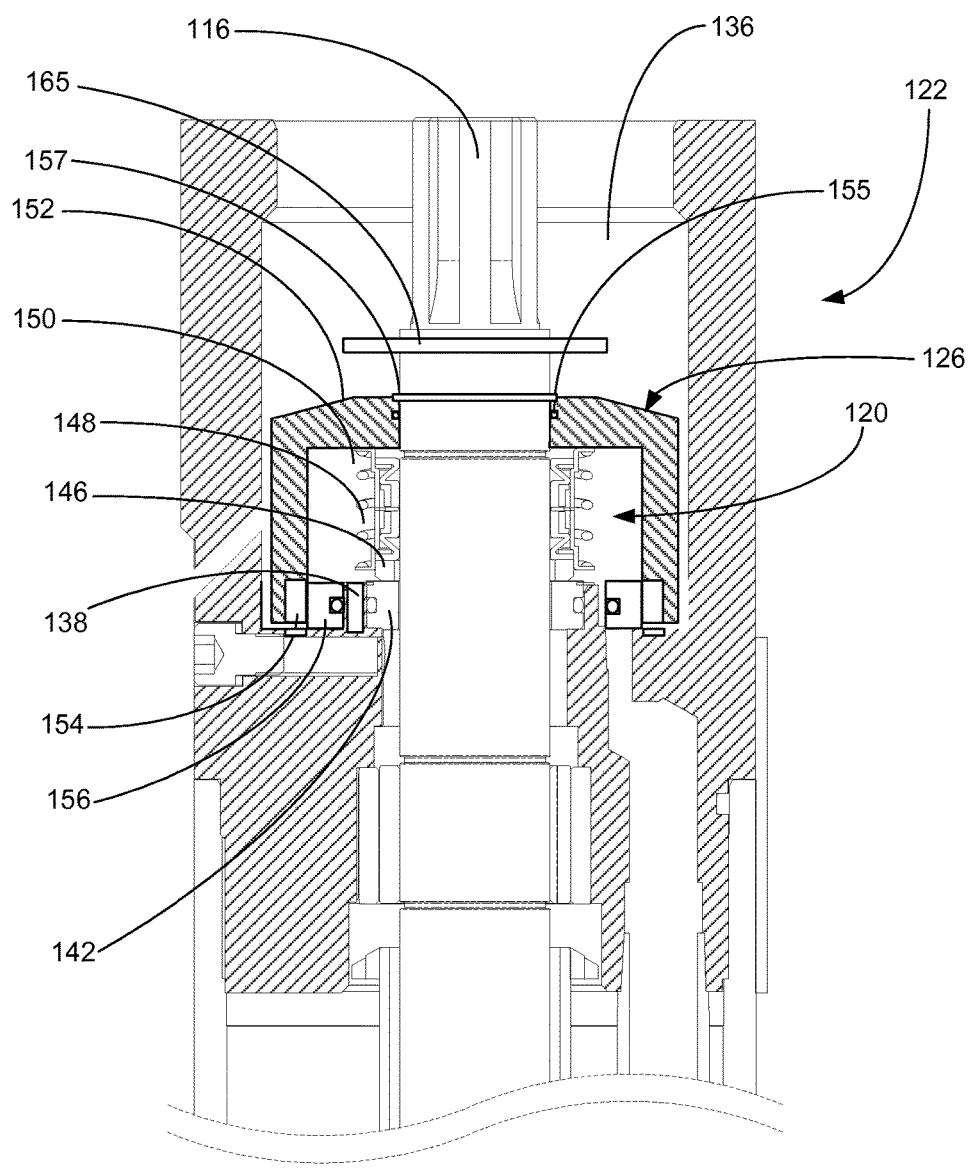
FIG. 5 is a close-up cross-sectional view of the head of the seal section of FIG. 2 showing a third embodiment of the redundant shaft seal system.

Turning to FIG. 5, shown therein is a third embodiment of the redundant shaft seal 126. In the third embodiment, the redundant shaft seal 126 includes a primary mechanical seal 120 that is captured within the cap 152. In an embodiment, the cap 152 is secured to the shaft 116 using key-and-slot and snap-ring mechanisms or two-piece rings that provide for rotation of the cap 152 with the shaft 116 while fixing the connection of the cap 152 to the shaft 116 at a specific location with the axial retaining ring 157. In the third embodiment, the cap 152 extends laterally outside the fixed ring 156. In this way, the contact ring 154 contacts the fixed ring 156 in a lateral relationship (rather than the vertical relationship depicted in FIGS. 3 and 4). The lateral contact relationship between the contact ring 154 and the fixed ring 156 in the third embodiment exhibits increased resistance to longitudinal displacement of the shaft 116. If the shaft 116 moves along the longitudinal axis during use, the contact ring 154 and fixed ring 156 may become slightly offset, but will remain in contact. The third embodiment may further include a sand shedder 165 connected to the shaft 116. The sand shedder 165 uses centrifugal force to throw solid particles to the outer portions of the mechanical seal chamber 136.

Figure 6:
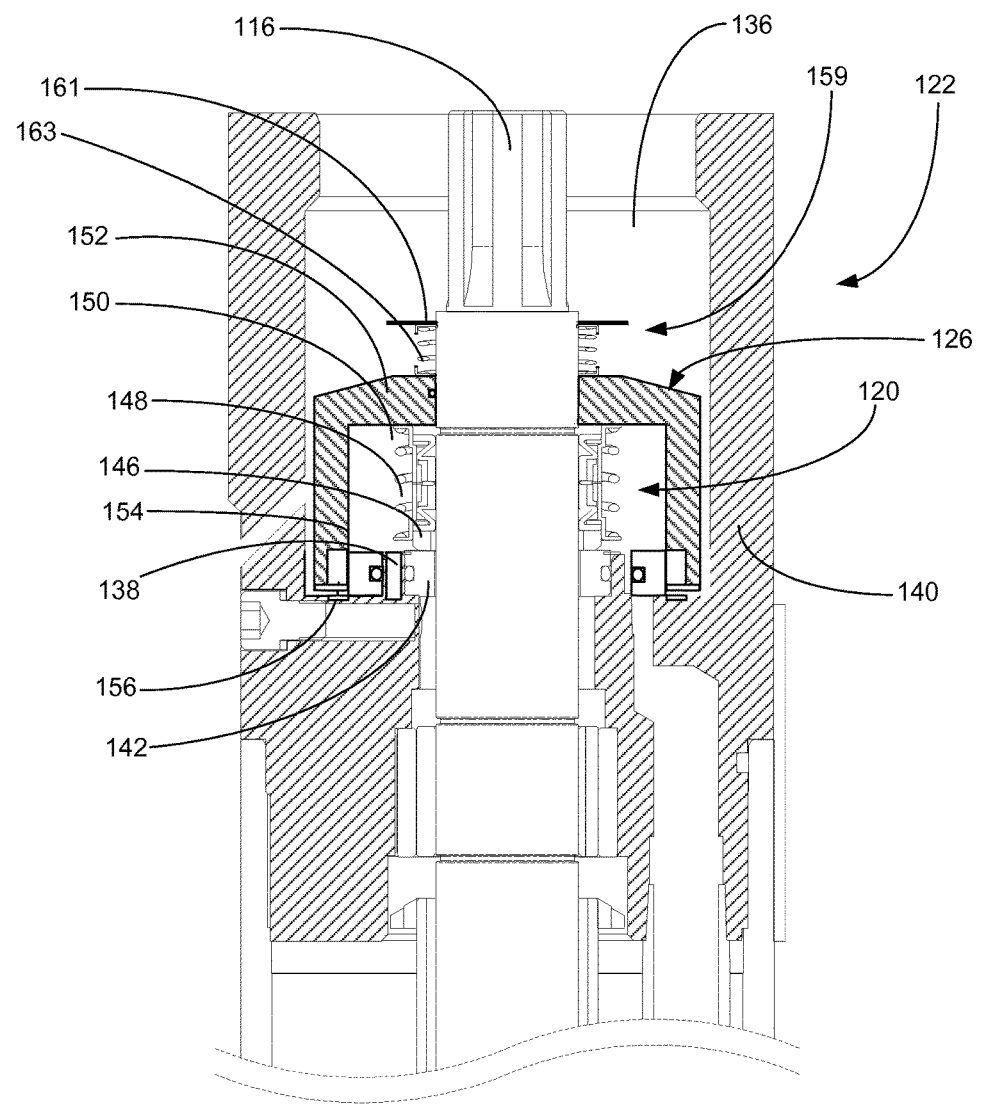
FIG. 6 is a close-up cross-sectional view of the head of the seal section of FIG. 2 showing a fourth embodiment of the redundant shaft seal system.

Turning to FIG. 6, shown therein is a fourth embodiment of the redundant shaft seal 126. Like the third embodiment, the redundant shaft seal 126 of the fourth embodiment includes a primary mechanical seal 120 that is captured within the cap 152 and the cap 152 extends laterally outside the fixed ring 156. The contact ring 154 contacts the fixed ring 156 in a lateral relationship that exhibits increased resistance to longitudinal displacement of the shaft 116. In the fourth embodiment, the cap 152 is connected to the shaft 116 with a key-and-slot mechanism that allows the shaft 116 to move along a longitudinal axis through the cap 152 while causing the cap 152 to rotate with the shaft. To maintain the position of the cap 152 during use, the redundant shaft seal 126 of the fourth embodiment further includes the upper spring assembly 159 that includes a spring cap 161 and spring 163. The spring cap 161 is attached to the shaft 116 above the cap 152 and provides a base for the spring 163. The spring 163 presses downward onto the cap 152. In the event the shaft 116 axially displaces, the cap 152 is kept in contact with the stationary ring 142 by the upper spring assembly 159.

Figure 7:
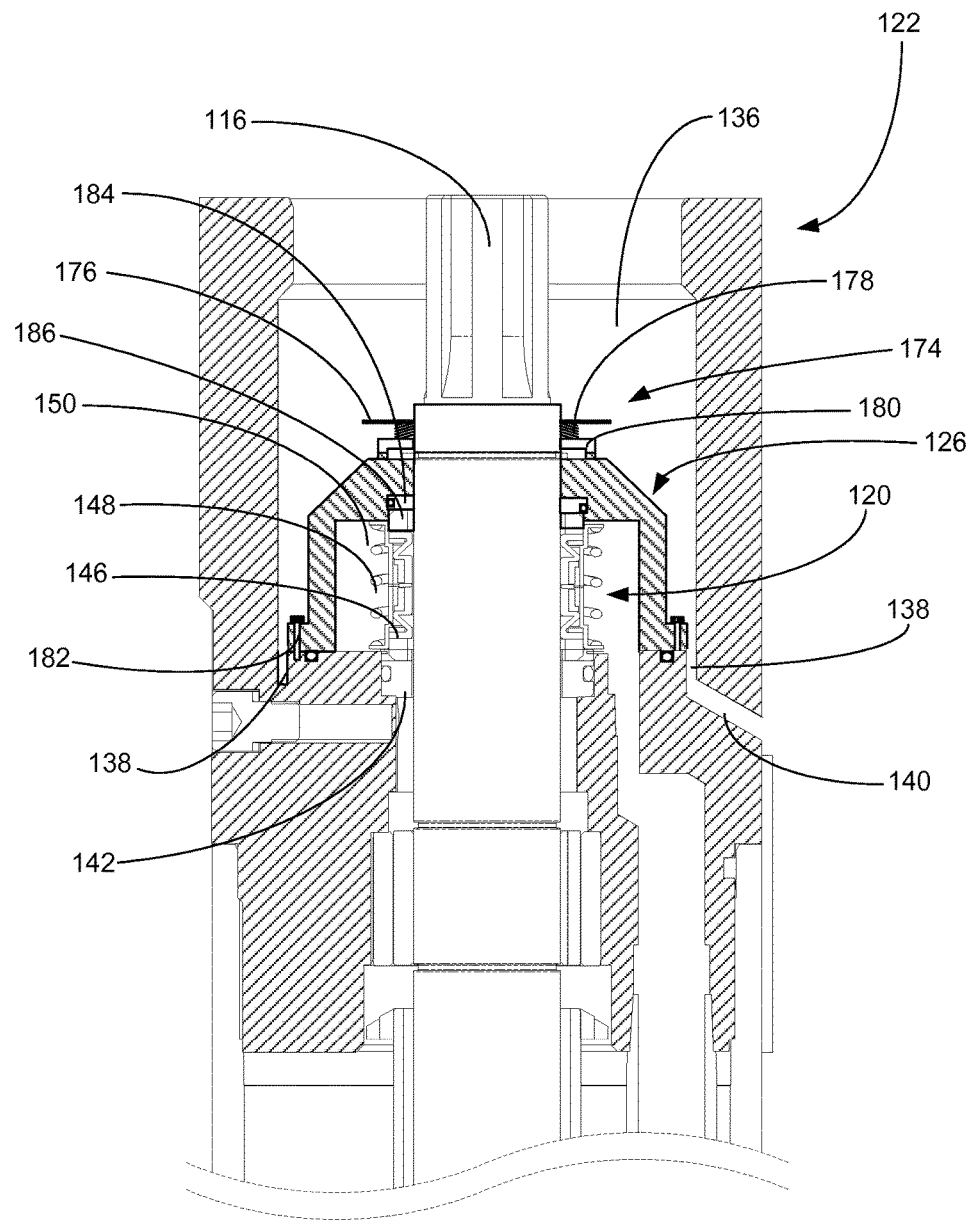
FIG. 7 is a close-up cross-sectional view of the head of the seal section of FIG. 2 showing a fifth embodiment of the redundant shaft seal system.

Turning to FIG. 7, shown therein is a fifth embodiment in which the cap 152 is secured in a stationary position within the head 122. In a particular embodiment, the cap 152 is secured within the head 122 by fasteners 182 or other suitable attachment mechanism. The redundant shaft seal 126 includes a captured ring 184 in a fixed position within the cap 152 and rotational ring 186. The rotational ring 186 is adjacent the retainer ring 150 of the primary mechanical seal 120. The spring 148 presses the retainer ring 150 and rotational ring 186 against the stationary captured ring 184 to create a sealing interface at the redundant shaft seal 126.

In this way, the spring 148 provides compression for both the primary mechanical seal 120 and redundant shaft seal 126.

The fifth embodiment further includes an auxiliary lip seal 174. The auxiliary lip seal 174 includes a backing plate 176, a spring 178 and a lip seal 180. The backing plate 176 is fixed in position with the shaft 116. The spring 178 is opposed by the backing plate 176 and forces the lip seal 180 against the top of the cap 152. In this way, the auxiliary lip seal 174 provides an additional seal at the top of the cap 152 and forces seals cap 152 along the shaft 116. Although the fifth embodiment has been depicted with a lip seal 180, it will be appreciated that other seals can be used to seal the stationary cap 152 from the rotating shaft 116. For example, it may be beneficial to utilize a mechanical seal between the shaft 116 and the top of the cap 152.

Thus, the embodiments include a pumping system 100 that includes a pump assembly 108, a motor assembly 110 and a seal section 112. The seal section 112 includes one or more fluid separation mechanisms and one or more primary mechanical seals 120 disposed along the shaft 116. To improve the resiliency of the primary mechanicals seals 120 to the intrusion of wellbore fluids and particles, the seal section further includes one or more redundant shaft seals 126. Each of the one or more redundant shaft seals 126 is configured and installed to eliminate or mitigate the exposure of the corresponding primary mechanical seal 120 to wellbore fluids and particles. The use of the redundant shaft seals 126 is believed to prolong the useful life of the primary mechanical seals 120.

It will be further understood that aspects of the various embodiments disclosed herein are interchangeable unless otherwise noted. For example, it may be beneficial in certain applications to combine the use of the auxiliary mechanical seal 166 with the first embodiment depicted in FIG. 3 or the fifth embodiment depicted in FIG. 7. As additional examples, it may be beneficial to include the dual-acting primary mechanical seal 120 with the first embodiment depicted in FIG. 1, or to employ the single-acting primary mechanical seal with the second, third, fourth or fifth embodiments. It will be further understood that embodiments include the use of multiple redundant shaft seals 126 within a single seal section 112 and that these multiple redundant shaft seals 126 may vary in design. Although the redundant shaft seals of the embodiments have been disclosed as incorporated within the seal section 112, it will be understood that the same redundant shaft sealing mechanisms could be successfully employed within the motor 110.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the present disclosure to the full extent indicated by the broad general meaning of the terms in which the appended claims are expressed. It will be appreciated by those skilled in the art that the teachings of the present embodiments can be applied to other systems without departing from the scope and spirit of the present application.

What is claimed is:

1. A seal section for use in a downhole submersible pumping system, the seal section comprising:
   one or more fluid separation mechanisms;
   a shaft;

one or more primary mechanical seals; wherein each of the one or more primary mechanical seals is disposed along the shaft; and one or more redundant shaft seals, wherein each of the one or more redundant shaft seals substantially surrounds a corresponding one of the one or more primary mechanical seals, wherein each of the one or more redundant shaft seals comprises a cap connected to the shaft and configured for rotation with the shaft, and wherein each of the one or more redundant shaft seals comprises:
- a fixed ring that remains stationary with respect to the shaft and
- a contact ring secured within the cap and configured for rotation with the shaft, wherein the contact ring is in vertical contact with the fixed ring.

2. The seal section of claim 1, wherein each of the one or more redundant shaft seals comprises:
- a fixed ring that remains stationary with respect to the shaft; and
- a contact ring secured within the cap and configured for rotation with the shaft, wherein the contact ring is in lateral contact with the fixed ring.

3. The seal section of claim 1, wherein each of the one or more redundant shaft seals comprises:
- a fixed ring that remains stationary with respect to the shaft; and
- a lip seal secured within the cap and configured for rotation with the shaft, wherein the lip seal is in contact with the fixed ring.

4. The seal section of claim 1, further comprising an upper spring assembly, wherein the upper spring assembly is connected to the shaft and applies a downward force on the cap.

5. The seal section of claim 1, wherein each of the one or more redundant shaft seals comprises a cap connected to the seal section that remains stationary with respect to the rotational movement of the shaft.

6. The seal section of claim 5, wherein the one or more redundant shaft seals comprises:
- a captured ring within the cap, wherein the captured ring is fixed to a stationary cap; and
- a rotational ring adjacent the captured ring, wherein the rotational ring is configured for rotation with the shaft.

7. A seal section for use in a pumping system, the seal section comprising:
- one or more fluid separation mechanisms;
- a shaft;
- a primary mechanical seal;
- a redundant shaft seal, wherein the redundant shaft seal substantially surrounds the primary mechanical seal; and
- an internal seal chamber defined by the annular space between the primary mechanical seal and the redundant shaft seal, wherein the redundant shaft seal comprises a cap connected to the shaft and configured for rotation with the shaft, and wherein the redundant shaft seal comprises:
- a fixed ring that remains stationary with respect to the shaft and
- a contact ring secured within the cap and configured for rotation with the shaft, wherein the contact ring is in vertical contact with the fixed ring.

* * * * *